(12) United States Patent
Christensen et al.

(10) Patent No.: US 10,192,250 B1
(45) Date of Patent: Jan. 29, 2019

(54) SYSTEMS AND METHODS FOR PROVIDING ACCESS TO DATA SETS OWNED BY DIFFERENT ENTITIES

(71) Applicant: Veritas Technologies LLC, Mountain View, CA (US)

(72) Inventors: Aaron Christensen, Apple Valley, MN (US); Steve A. Vranyes, North Oaks, MN (US); Jed Gresham, Sanford, FL (US); Samuel Pierson, Coon Rapids, MN (US)

(73) Assignee: Veritas Technologies LLC, Mountain View, CA (US)

( * ) Notice: Subject to any disclaimer, the term of this patent is extended or adjusted under 35 U.S.C. 154(b) by 678 days.

(21) Appl. No.: 14/664,300

(22) Filed: Mar. 20, 2015

(51) Int. Cl.
*G06Q 30/06* (2012.01)
*G06Q 20/12* (2012.01)
*G06Q 50/18* (2012.01)
*G06Q 50/00* (2012.01)

(52) U.S. Cl.
CPC ....... *G06Q 30/0613* (2013.01); *G06Q 20/123* (2013.01); *G06Q 30/0623* (2013.01); *G06Q 50/184* (2013.01); *G06Q 2220/10* (2013.01); *G06Q 2220/18* (2013.01)

(58) Field of Classification Search
CPC .................................. G06Q 30/0601–30/0645
USPC ............................................... 705/26.1–27.2
See application file for complete search history.

(56) References Cited

U.S. PATENT DOCUMENTS

| | | | |
|---|---|---|---|
| 6,539,391 B1* | 3/2003 | DuMouchel | G06F 17/3061 |
| 8,589,292 B1* | 11/2013 | Huberman | G06Q 30/06 |
| | | | 705/26.35 |
| 8,935,702 B2* | 1/2015 | Harris | G06F 9/5072 |
| | | | 709/226 |
| 9,076,153 B2* | 7/2015 | Agarwal | G06Q 30/0601 |
| 9,396,448 B2* | 7/2016 | Amir | G06Q 10/10 |
| 9,576,292 B2* | 2/2017 | Freishtat | G06Q 30/06 |
| 9,590,992 B2* | 3/2017 | Litoiu | H04L 63/10 |
| 9,953,386 B2* | 4/2018 | Baldwin | G06Q 50/265 |
| 2009/0125420 A1* | 5/2009 | Zhang | G06Q 30/02 |
| | | | 705/26.1 |

(Continued)

OTHER PUBLICATIONS

Aeham Abushwashi; Systems and Methods for Maintaining Aggregate Tables in Databases; U.S. Appl. No. 14/447,619, filed Jul. 31, 2014.

(Continued)

*Primary Examiner* — Nicholas D Rosen
(74) *Attorney, Agent, or Firm* — FisherBroyles LLP

(57) ABSTRACT

The disclosed computer-implemented method for providing access to data sets owned by different entities may include (1) providing a data marketplace platform that allows a plurality of data set owners to each list their own data sets for licensing to any of a plurality of prospective data set license buyers, (2) receiving, at the data marketplace platform, a data set owned by a data set owner, (3) creating a sale listing for the data set, (4) displaying, on the data marketplace platform, the sale listing for the data set to at least one prospective data set license buyer, (5) receiving, from the prospective data set license buyer, an order to license the data set, and (6) providing, via the data marketplace platform, access for the prospective data set license buyer to the data set. Various other methods, systems, and computer-readable media are also disclosed.

20 Claims, 7 Drawing Sheets

(56) References Cited

U.S. PATENT DOCUMENTS

| | | | |
|---|---|---|---|
| 2011/0061057 A1* | 3/2011 | Harris | G06F 9/5072 718/104 |
| 2011/0258064 A1* | 10/2011 | Agarwal | G06Q 30/02 705/26.1 |
| 2011/0295694 A1* | 12/2011 | Coggeshall | G06Q 30/02 705/14.66 |
| 2012/0011031 A1* | 1/2012 | Lewis | G06Q 30/0601 705/27.1 |
| 2012/0173355 A1* | 7/2012 | Smith | G06Q 10/00 705/26.1 |
| 2013/0151363 A1* | 6/2013 | Khosravy | G06Q 30/02 705/26.1 |
| 2014/0372240 A1* | 12/2014 | Freishtat | G06Q 30/06 705/26.1 |
| 2015/0074043 A1* | 3/2015 | Amir | G06Q 10/06 707/609 |
| 2015/0089626 A1* | 3/2015 | Korangy | H04L 67/1097 726/12 |
| 2015/0142686 A1* | 5/2015 | Baldwin | G06Q 50/265 705/325 |
| 2015/0161210 A1* | 6/2015 | Cook | G06F 21/6245 707/600 |
| 2015/0221024 A1* | 8/2015 | Sirsi | G06Q 30/08 705/26.3 |
| 2015/0288669 A1* | 10/2015 | Litoiu | H04L 63/10 726/4 |
| 2016/0253340 A1* | 9/2016 | Barth | G06F 17/30082 707/756 |

OTHER PUBLICATIONS

"AWS (Amazon Web Services)", http://aws.amazon.com/, as accessed Feb. 13, 2015, (Oct. 29, 2005).

"Pitney Bowes", http://www.pitneybowes.com/us, as accessed Feb. 13, 2015, (Jul. 13, 2014).

"Data Exchange", http://new.thedataexchange.com/, as accessed Feb. 13, 2015, (Dec. 22, 2014).

"DataMarket", http://DataMarket.com/, as accessed Feb. 13, 2015, (Dec. 25, 1996).

"Kaggle", http://www.kaggle.com/, as accessed Feb. 13, 2015, (Feb. 6, 2010).

"Qlik", http://www.qlik.com/, as accessed Feb. 13, 2015, (Feb. 12, 2002).

* cited by examiner

SYSTEMS AND METHODS FOR PROVIDING ACCESS TO DATA SETS OWNED BY DIFFERENT ENTITIES

BACKGROUND

Large data sets are being used increasingly for everything from predicting consumer behavior to managing traffic conditions on the roadways. Continuing improvements in storage technology mean that many of the previous barriers to managing large data sets are disappearing, allowing even relatively small organizations to store and process large databases. More and more, metadata gleaned from analysis of data is also being generated, used, and stored. But data is only as useful as the ability to locate that data and analyze it. The increasing number of data sets in the world only increases the difficulty of determining which set of data is the right data for an individual or organization to analyze.

Traditional systems for managing sets of data are typically designed with an individual organization in mind. An organization may be able to access sets owned by the organization, but may be unable to share any of this information with outside entities or find data sets owned by others. Some traditional systems may allow users to buy data sets, but may not allow for negotiation on critical issues such as price and licensing. Even once a data set has been purchased, traditional systems may not provide a method to connect an organization that has acquired a data set with an analyst who can analyze the data set in order to draw meaningful conclusions. Accordingly, the instant disclosure identifies and addresses a need for additional and improved systems and methods for providing access to data sets owned by different entities.

SUMMARY

As will be described in greater detail below, the instant disclosure describes various systems and methods for providing access to data sets owned by different entities by providing a platform that enables different entities to store data sets, list stored data sets for licensing, browse sale listings for data sets that are available for licensing, offer analysis services, contract analysts to analyze data sets, and/or negotiate for license agreements for data sets.

In one example, a computer-implemented method for providing access to data sets owned by different entities may include (1) providing a data marketplace platform that allows a data set owners to each list their own data sets for licensing to any of a prospective data set license buyers, where each data set may include a samples from a statistical population and at least one variable describing each sample, (2) receiving, at the data marketplace platform, a data set owned by a data set owner, (3) creating a sale listing for the data set that may include information about the data set and/or information about the data set owner, (4) displaying, on the data marketplace platform, the sale listing for the data set to at least one prospective data set license buyer who does not own the data set, (5) receiving, from the prospective data set license buyer, an order to license the data set from the data set owner, and (6) providing, via the data marketplace platform and in response to the order, access for the prospective data set license buyer to the data set.

In one embodiment, receiving the order to license the data set may include receiving a bid to license the data set. In this embodiment, providing access to the data set may be done in response to the data set owner accepting the bid to license the data set. Additionally or alternatively, the order to license the data set from the data set owner may include an agreement about potential royalties owed to the data set owner on potential data sets derived from the data set. In some examples, providing access for the prospective data set license buyer to the data set may happen in response to receiving confirmation, via the database market platform, that the prospective data set license buyer has paid the data set owner.

In one example, the computer-implemented method may further include receiving, via the data marketplace platform, from the data set owner, a counter-offer in response to receiving the order from the prospective data set license buyer. This example may also include receiving, via the data marketplace platform, from the prospective data set license buyer, an acceptance of the counter-offer from the data set owner.

In one embodiment, receiving, at the data marketplace platform, the data set may include storing the data set on the data marketplace platform. Additionally or alternatively, receiving, at the data marketplace platform, the data set may include analyzing the data set at the data marketplace platform to gather metadata about the data set.

In one embodiment, the information about the data set may include (1) a rating of the quality of the data set provided by at least one previous data set license buyer with previous access to the data set via the data marketplace platform, (2) a rating of the quality of the data set provided by at least one data set analyst registered with the data marketplace platform with previous access to the data set via the data marketplace platform, and/or (3) a sample of data from the data set. In some embodiments, the information about the data set may include an average rating from multiple previous licensers and/or analysts.

In one embodiment, the computer-implemented method may further include receiving, via the data marketplace platform, a request for data from the prospective data set license buyer that describes a requested data set that the prospective data set license buyer does not own. In this embodiment, the computer-implemented method may also include displaying the request for data on the data marketplace platform to a requested data set owner who owns the requested data set and stores the requested data set on the data marketplace platform and/or a data set analyst registered with the data marketplace platform who can analyze the requested data set. In some examples, the computer-implemented method may further include (1) receiving, via the data marketplace platform, an offer from the requested data set owner to sell a license for the requested data set to the prospective data set license buyer, (2) receiving, via the data marketplace platform, an offer to analyze the requested data set from the data set analyst, and/or (3) receiving, via the data marketplace platform, an offer to acquire a license to the requested data set from the data set analyst.

In one embodiment, the computer-implemented method may further include receiving, via the data marketplace platform, a request from the prospective data set license buyer for at least one data set analyst registered with the data marketplace platform to analyze the data set and receiving, via the data marketplace platform, an offer from the data set analyst to analyze the data set for the prospective data set license buyer using access potentially provided to the data set by the data marketplace platform. In some examples, the computer-implemented method may further include making the data set available to the data set analyst via the data marketplace platform in response to the prospective data set license buyer accepting the offer from the data set analyst. In some examples, the computer-implemented method may further include making an analysis of the data set available to the prospective data set license buyer via the data marketplace platform in response to the data set analyst indicating that the analysis is complete.

In one embodiment, the computer-implemented method may further include receiving, via the data marketplace platform, a search query from the prospective data set license buyer that may include at least one characteristic defining a type of data set that the prospective data set license buyer is interested in and displaying, to the prospective data set license buyer, on the data marketplace platform, a list of available data sets for licensing that are stored on the data marketplace platform and satisfy the characteristic. Additionally or alternatively, the computer-implemented method may further include receiving, via the data marketplace platform, a search query from the prospective data set license buyer that may include at least one characteristic defining a type of data set analyst that the prospective data set license buyer is interested in and displaying, to the prospective data set license buyer, on the data marketplace platform, a list of available data set analysts registered with the data marketplace platform that satisfy the characteristic.

In one embodiment, the data marketplace platform may include a private instance of the data marketplace platform that is accessible to only one organization and is privately hosted by that organization. In some examples, the computer-implemented method may further include linking the private instance of the data marketplace platform with a public instance of the data marketplace platform that is accessible to multiple organizations. Additionally, the computer-implemented method may further include transferring at least one licensed data set between the private instance of the data marketplace platform and the public instance of the data marketplace platform in response to the prospective data set license buyer purchasing a license to the licensed data set.

Additionally or alternatively, there may exist an additional private instance of the data marketplace platform that is accessible to only one additional organization and is privately hosted by that additional organization. In some examples, the computer-implemented method may further include linking the private instance of the data marketplace platform with the additional private instance of the data marketplace platform and/or transferring at least one licensed data set between the private instance of the data marketplace platform and the additional private instance of the data marketplace platform in response to the prospective data set license buyer purchasing a license to the licensed data set.

In one embodiment, the computer-implemented method may further include receiving, from the prospective data set license buyer via the data marketplace platform, a request to view a sample of the data set. In some examples, the computer-implemented method may further include receiving, via the data marketplace platform, authorization from the data set owner to grant access to the sample of the data set to the prospective data set license buyer and granting, via the data marketplace platform, access to the sample of the data set to the prospective data set license buyer in response to receiving the authorization from the data set owner.

In one embodiment, a system for implementing the above-described method may include (1) a platform module, stored in memory, that provides a data marketplace platform that allows a data set owners to each list their own data sets for licensing to any of a prospective data set license buyers, where each data set may include a samples from a statistical population and at least one variable describing each sample, (2) a receiving module, stored in memory, that receives, at the data marketplace platform, a data set owned by a data set owner, (3) a creation module, stored in memory, that creates a sale listing for the data set that may include information about the data set and information about the data set owner, (4) a display module, stored in memory, that displays, on the data marketplace platform, the sale listing for the data set to at least one prospective data set license buyer who does not own the data set, (5) an order module, stored in memory, that receives, from the prospective data set license buyer, an order to license the data set from the data set owner, (6) a providing module, stored in memory, that provides, via the data marketplace platform and in response to the order, access for the prospective data set license buyer to the data set, and (7) at least one physical processor configured to execute the platform module, the receiving module, the creation module, the display module, the order module, and the providing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) provide a data marketplace platform that allows a data set owners to each list their own data sets for licensing to any of a prospective data set license buyers, where each data set may include a samples from a statistical population and at least one variable describing each sample, (2) receive, at the data marketplace platform, a data set owned by a data set owner, (3) create a sale listing for the data set that may include information about the data set and information about the data set owner, (4) display, on the data marketplace platform, the sale listing for the data set to at least one prospective data set license buyer who does not own the data set, (5) receive, from the prospective data set license buyer, an order to license the data set from the data set owner, and (6) provide, via the data marketplace platform and in response to the order, access for the prospective data set license buyer to the data set.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
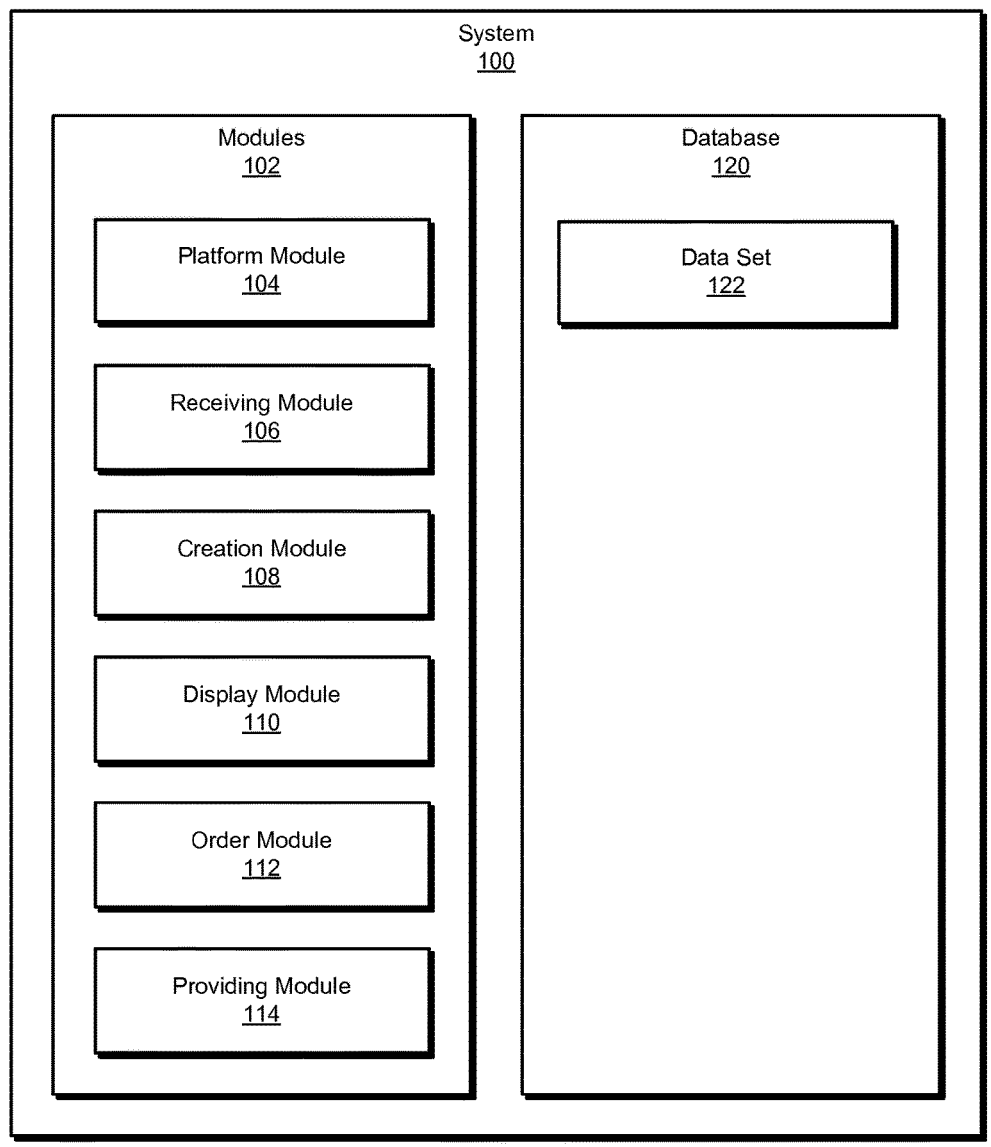
FIG. 1 is a block diagram of an exemplary system for providing access to data sets owned by different entities.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing access to data sets owned by different entities. As will be explained in greater detail below, by providing a data marketplace platform that allows different entities to buy, license, analyze, and/or contract analysts for data sets, the systems described herein may allow individuals and organizations to efficiently gain access to a far greater number of data sets than otherwise while also allowing individuals and organizations an opportunity to monetize existing data sets and/or data analysis skills.

Figure 2:
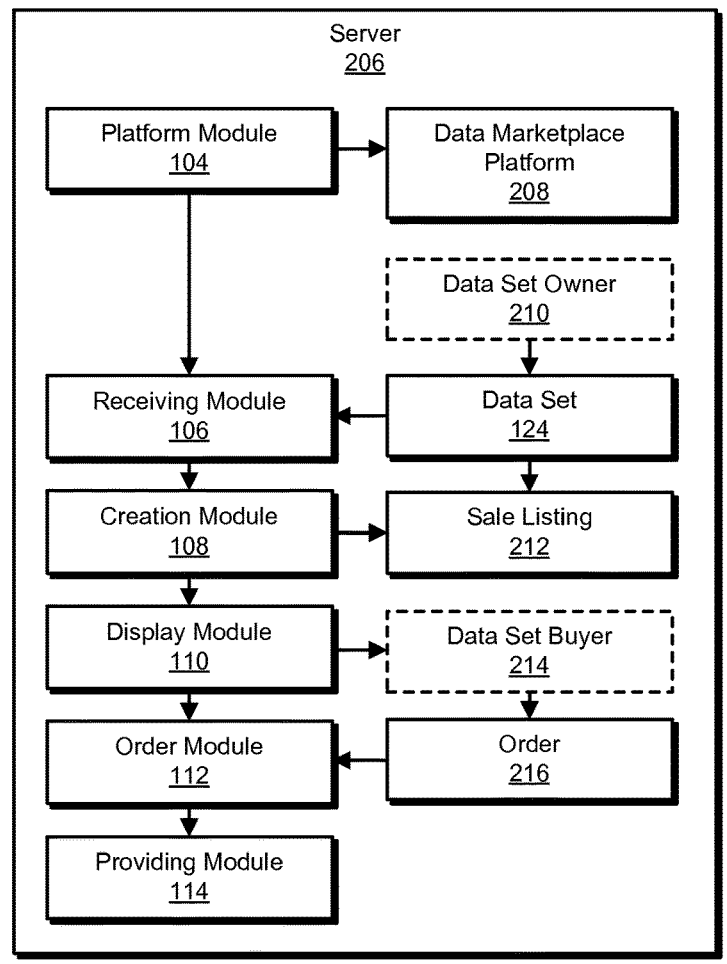
FIG. 2 is a block diagram of an additional exemplary system for providing access to data sets owned by different entities.
Figure 4:
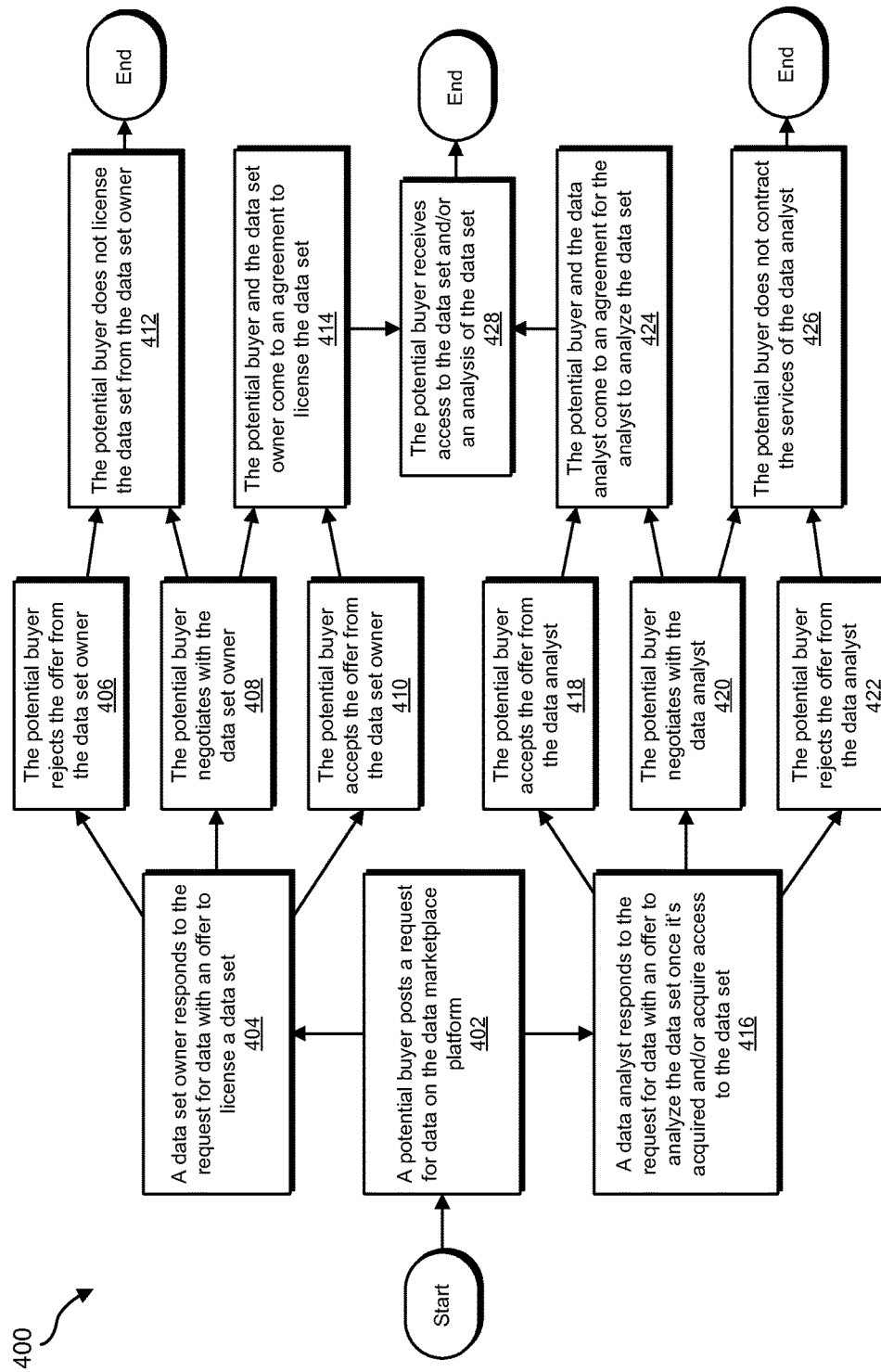
FIG. 4 is a flow diagram of an exemplary method for providing access to data sets owned by different entities.
Figure 5:
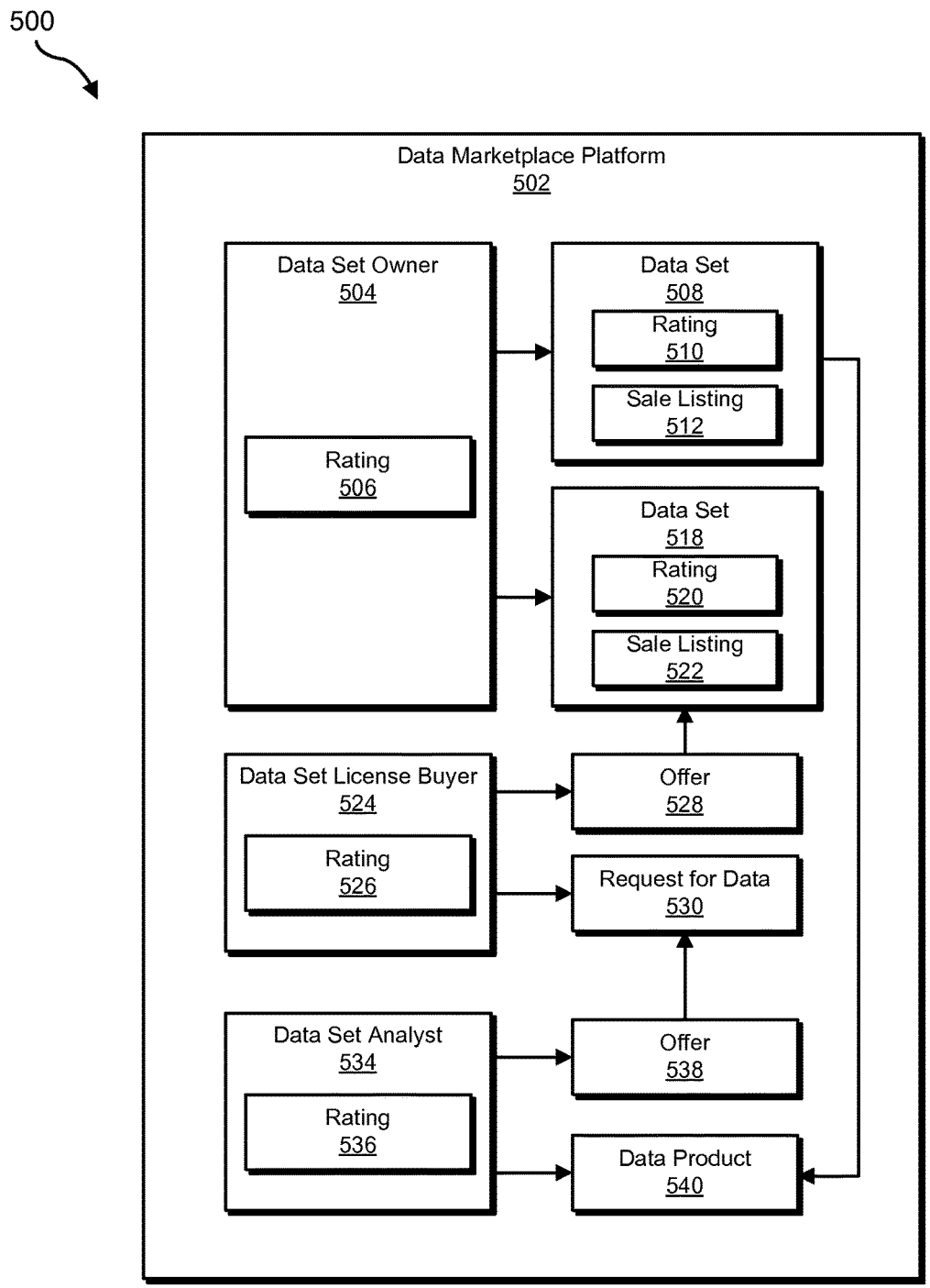
FIG. 5 is a block diagram of an exemplary computing system for providing access to data sets owned by different entities.

The following will provide, with reference to FIGS. 1, 2, and 5, detailed descriptions of exemplary systems for providing access to data sets owned by different entities. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for providing access to data sets owned by different entities. As illustrated in this figure, exemplary system 100 may include one or more modules 102 for performing one or more tasks. For example, and as will be explained in greater detail below, exemplary system 100 may include a platform module 104 that may provide a data marketplace platform that allows a plurality of data set owners to each list their own data sets for licensing to any of a plurality of prospective data set license buyers, where each data set may include a plurality of samples from a statistical population and at least one variable describing each sample. Exemplary system 100 may additionally include a receiving module 106 that may receive, at the data marketplace platform, a data set owned by a data set owner. Exemplary system 100 may also include a creation module 108 that may create a sale listing for the data set that may include information about the data set and information about the data set owner. Exemplary system 100 may additionally include a display module 110 that may display, on the data marketplace platform, the sale listing for the data set to at least one prospective data set license buyer who does not own the data set. Exemplary system 100 may also include an order module 112 that may receive, from the prospective data set license buyer, an order to license the data set from the data set owner. Exemplary system 100 may additionally include a providing module 114 that may provide, via the data marketplace platform and in response to the order, access for the prospective data set license buyer to the data set. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as server 206 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data sets.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a server 206. In one example, server 206 may be programmed with one or more of modules 102 and/or may store all or a portion of the data in database 120.

In one embodiment, one or more of modules 102 from FIG. 1 may, when executed by at least one processor of server 206, enable server 206 to provide access to data sets owned by different entities. For example, and as will be described in greater detail below, platform module 104 may provide a data marketplace platform 208 that allows a plurality of data set owners to each list their own data sets for licensing to any of a plurality of prospective data set license buyers, where each data set 124 may include a plurality of samples from a statistical population and at least one variable describing each sample. At any time, receiving module 106 may receive, at data marketplace platform 208, a data set 124 owned by a data set owner 210. Next, creation module 108 may create a sale listing 212 for data set 124 that may include information about data set 124 and information about data set owner 210. At some later time, display module 110 may display, on data marketplace platform 208, sale listing 212 for data set 124 to at least one data set buyer 214 who does not own data set 124. In some instances, order module 112 may receive, from data set buyer 214, an order 216 to license data set 124 from data set owner 210. If both parties agree, providing module 114 may provide, via data marketplace platform 208 and in response to order 216, access for data set buyer 214 to data set 124.

Server 206 generally represents any type or form of computing device that is capable of providing a data marketplace platform. Examples of server 206 include, without limitation, application servers and database servers configured to provide various database services and/or run certain software applications.

Figure 3:
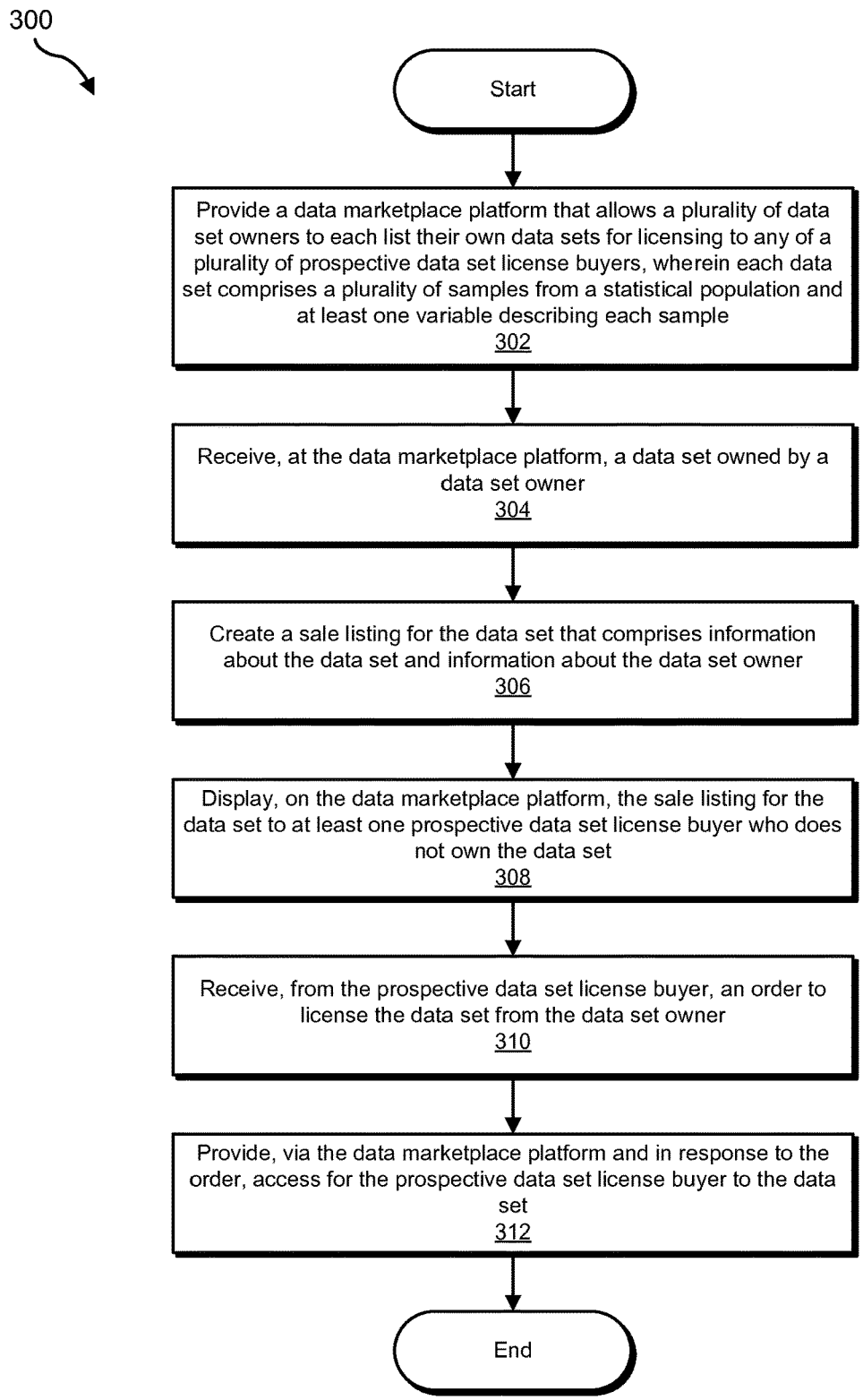
FIG. 3 is a flow diagram of an exemplary method for providing access to data sets owned by different entities.

FIG. 3 is a flow diagram of an exemplary computer-implemented method 300 for providing access to data sets owned by different entities. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may provide a data marketplace platform that allows a plurality of data set owners to each list their own data sets for licensing to any of a plurality of prospective data set license buyers, where each data set may include a plurality of samples from a statistical population and at least one variable describing each sample. For example, platform module 104 may, as part of server 206 in FIG. 2, provide data marketplace platform 208 that allows a plurality of data set owners to each list their own data sets for licensing to any of a plurality of prospective data set license buyers, where each data set 124 may include a plurality of samples from a statistical population and at least one variable describing each sample.

The term "data set," as used herein, generally refers to any collection of data. A data set may include any number of files, lists, items of data, database tables, and/or databases. Some examples of data sets may include, without limitation, meteorological data, demographic data, a mailing list, customer data, user data, traffic data, network data, business analyst data, financial data, academic and research oriented data, reports, financial analysis of publicly traded companies, modified census data, oil drilling information, and/or any data potentially of value to a given market.

The term "data set owner," as used herein, generally refers to any entity with the right to offer access to a data set. In some embodiments, a data set owner may be an individual, a group, and/or a corporation. In some examples, a data set owner may have collected the data set. In other examples, a data set owner may have purchased the rights to the data set from another entity. Additionally or alternatively, a data set owner may be a data set analyst that has generated the data set by analyzing one or more additional data sets.

The term "prospective data set license buyer," as used herein, generally refers to any entity that desires to license a data set. In some embodiments, a prospective data set license buyer may be an individual, a group, and/or a corporation. In some examples, a prospective data set license buyer may be purchasing a data set license for a third party. For example, a data set analyst may purchase a license for a data set in order to analyze the data set on behalf of an organization that has contracted the analyst's services. In some embodiments, a prospective data set license buyer may also be a data set owner.

The term "data marketplace platform," as used herein, generally refers to any platform that connects buyers, sellers, and/or analysts of data sets in order to enable the buying, selling, and/or analysis of data sets. Various embodiments of data marketplace platforms will be discussed in greater detail below.

Platform module 104 may provide the data marketplace platform in a variety of ways. For example, platform module 104 may host a web site and/or web services that provides an interface to the data marketplace platform. In some embodiments, the data marketplace platform may be hosted on one or more local servers. Additionally or alternatively, the data marketplace platform may be hosted on remote servers, e.g., the cloud.

In some embodiments, providing module 104 may host the data marketplace platform partially on local servers and partially on remote servers. For example, providing module 104 may host a public instance of the data marketplace platform in the cloud. In this example, instances of providing module 104 may also host one or more private instances of the data marketplace platform on servers owned by different entities. The entities may store their own data sets on their internal instances of the data marketplace platform but may still browse data sets owned by other entities on the public instance of the data marketplace platform and/or may list their data sets for licensing on the public instance of the data marketplace platform.

At step 304, one or more of the systems described herein may receive, at the data marketplace platform, a data set owned by a data set owner. For example, receiving module 106 may, as part of server 206 in FIG. 2, receive, at the data marketplace platform 208, data set 124 owned by data set owner 210.

Receiving module 106 may receive the data set in a variety of ways. For example, receiving module 106 may receive a data set that is being uploaded to the data marketplace platform by the owner via the Internet. In some embodiments, receiving module 106 may include a user interface that allows the data set owner to upload the data set in a browser. Additionally or alternatively, receiving module 106 may receive a data set uploaded via a file transfer protocol (FTP) application. In some embodiments, receiving module 106 may receive the data set by receiving access to a database and/or other means of data storage that contains the data set. Additionally or alternatively, receiving module 106 may receive the data set by receiving information about the data set and/or a storage location of the data set.

In some embodiments, receiving module 106 may receive a data set by linking an internal data analytics platform that hosts the data to the data marketplace platform. In one embodiment, the internal data analytics platform may designate the data as available for access via the data marketplace platform. Accordingly, the internal data analytics platform may provide the data set to the data marketplace platform (e.g., immediately and/or upon request) For example, an administrator of, a contributor to, and/or a consumer of the internal data analytics platform may mark the data set as available for external licensing. Additionally or alternatively, the internal data analytics platform may determine that the data set is suitable for external licensing based on one or more characteristics of the data set. For example, the internal data analytics platform may determine that the data set is suitable for external licensing based on a classification of the data set (e.g., a subject matter classification, a sensitivity classification, and/or a departmental classification). Additionally or alternatively, the internal data analytics platform may determine that the data set is suitable for external licensing based on one or more data sets from which the data set was derived being designated as suitable for external licensing. In some examples, the internal data analytics platform may determine that the data set is suitable for external licensing based on an analysis of the content of the data set.

In one embodiment, receiving module 106 may receive, at the data marketplace platform, the data set by storing the data set on the data marketplace platform. For example, the data marketplace platform may include extensive storage space to store the data sets listed for sale. In other embodiments, receiving module 106 may not store the data set on the data marketplace platform, but instead, may store information about the location of the data set and/or how to access the data set. In some embodiments, receiving module 106 may offer a choice of either option and/or may perform a combination of both options.

In some examples, receiving module 106 may analyze the data set at the data marketplace platform to gather metadata about the data set. For example, receiving module 106 may analyze the data set to determine a category for the data set, topics covered by the data set, the size of the data set, the number of items in the data set, the creation date of the data set, and/or tags for the data set.

At step 306, one or more of the systems described herein may create a sale listing for the data set that may include information about the data set and/or information about the data set owner. For example, creation module 108 may, as part of server 206 in FIG. 2, create sale listing 212 for data set 124 that may include information about data set 124 and information about data set owner 210.

The phrase "sale listing," as used herein, generally refers to any description of a data set that is available for licensing on a data marketplace platform. In some examples, a sale listing may include a name and/or title of the data set, a summary of the data set, a description of the data set, a price to license the data set, terms for royalties on data derived from the data set, terms for licensing the data set, various prices for licensing the data set under various terms, information about the location of the data set, terms for how the data set may be accessed and/or analyzed, a sample of data from the data set, one or more ratings of the data set, a list of previous buyers of licenses for the data set, a list of owners of the data set, a list of analysts who have analyzed the data set, a size of the data set, tags that have been applied to the data set, categories into which the data set falls, a domain of the data set, one or more reviews of the data set, topics covered by the data set, and/or any other suitable metadata about the data set. In some embodiments, some of the items in a sale listing may be negotiable while others may be fixed. For example, one sale listing may have a negotiable price but fixed licensing agreement, while another listing might allow negotiation on both points and another might have a fixed price and a fixed licensing agreement.

Creation module 108 may create the sale listing in a variety of ways. For example, creation module 108 may automatically generate some of the sale listing based on metadata about the data set gathered by the data marketplace platform. In one example, creation module 108 may automatically list the size of the data set, tags of the data set, analysts associated with the data set, and/or the location of the data set.

Additionally or alternatively, creation module 108 may provide a user interface, such as a browser form, that allows the data set owner to manually enter information about the data set. For example, the data set owner may manually enter the asking price of the data set, a description of the data set, licensing terms of the data set, and/or topics related to the data set. In some examples, creation module 108 may automatically generate information that the data set owner may then modify. For example, creation module 108 may automatically generate tags for a data set and the data set owner may then add additional tags, modify the generated tags, and/or delete the generated tags.

In one embodiment, the information about the data set may include a rating of the quality of the data set provided by at least one previous data set license buyer with previous access to the data set via the data marketplace platform, a rating of the quality of the data set provided by at least one data set analyst registered with the data marketplace platform with previous access to the data set via the data marketplace platform, and/or a sample of data from the data set. For example, the systems described herein may provide an individual or organization who has accessed a data set—either as a license purchases or as an analyst—with the opportunity to create a rating and/or review of the data set. The rating may include, for example, a number of stars, a numeric value, several values on different scales, a text description of their review of the data set, and/or some combination of the above. The sale listing for the data set may include individual ratings of the data set from previous purchasers and/or analysts and/or an aggregated rating. In some embodiments, the information may also include a sample of the data set, such as a set of contacts from a mailing list with redacted contact information, meteorological data from a small portion of the timespan covered by the data set, and/or some other example data from within the data set.

In some embodiments, creation module 108 may allow a data set analyst to create a sale listing for a prospective data set that does not yet exist. In these embodiments, creation module 108 may include information in the sale listing that distinguishes the prospective listing from listings for already existing data sets. For example, a demographic analyst may create a listing for a data set based on an analysis of census data that the analyst has not yet performed but could perform if contracted to do so.

At step 308, one or more of the systems described herein may display, on the data marketplace platform, the sale listing for the data set to at least one prospective data set license buyer who does not own the data set. For example, display module 110 may, as part of server 206 in FIG. 2, display, on data marketplace platform 208, sale listing 212 for data set 124 to at least one data set 124 buyer 214 who does not own data set 124.

Display module 110 may display the sale listing in a variety of ways. For example, display module 110 may display the sale listing in a browser window. In another embodiment, display module 110 may display the sale listing in an application designed to interface with the data marketplace platform. Additionally or alternatively, display module 110 may display the sale listing in a specially configured news feed, such as a really simple syndication (RSS) feed.

In some embodiments, the systems described herein may receive, via the data marketplace platform, a search query from the prospective data set license buyer that includes at least one characteristic defining a type of data set that the prospective data set license buyer is interested in. In these embodiments, display module 110 may display, to the prospective data set license buyer, on the data marketplace platform, a list of available data sets for licensing that are stored on the data marketplace platform and satisfy the characteristic. For example, a prospective buyer may search for data sets using the terms "meteorological data from Ohio." Display module 110 may then display any data sets tagged with the tags "meteorology" and "Ohio" and/or any data sets that feature the phrase "meteorological data from Ohio" in the name, summary, and/or description.

Display module 110 may also display multiple listings to prospective buyers in a variety of other fashions. For example, display module 110 may display all the data sets in a certain category, with a certain tag, related to a certain topic, owned by a certain data set owner, associated with a certain analyst, available within a certain price range, and/or added to the data marketplace platform within a certain date range. Display module 110 may also display all of the currently available data sets on the data marketplace platform ordered by some criterion, such as alphabetically, by price, by size, and/or by date added.

In some examples, data set analysts may also search for sale listings. For example, a data set analyst who specializes in analyzing financial data may search for data sets in the category "financial data" that do not have any analysts currently listed as associated with them.

At step 310, one or more of the systems described herein may receive, from the prospective data set license buyer, an order to license the data set from the data set owner. For example, order module 112 may, as part of server 206 in FIG. 2, receive, from data set buyer 214, order 216 to license data set 124 from data set owner 210.

The term "order," as used herein, generally refers to any indication that a prospective buyer would like to purchase rights to a data set. In some embodiments, an order may include an acceptance of a data set owner's asking price and/or licensing terms. In other embodiments, an order may be an inquiry about a data set that does not imply acceptance of any of the terms. In some examples, an order may propose new terms, such as a new asking price and/or licensing agreement.

Order module 112 may receive the order from the prospective buyer in a variety of ways. For example, order module 112 may receive the order via a data set order form on the data marketplace platform website. In another embodiment, order module 112 may receive the order via an application designed to interface with the data marketplace platform. In some embodiments, order module 112 may create a "negotiation" entry in a database on the data marketplace platform in response to receiving the order.

In some examples, order module 112 may receive, via the data marketplace platform, from the data set owner, a counter-offer in response to receiving the order from the prospective data set license buyer. For example, the prospective buyer may offer a price that is lower than the asking price, and the data set owner may suggest a price that is between the buyer's price and the asking price. Additionally or alternatively, the prospective buyer may specify certain licensing terms in the order, such as royalties on derivative data, access for the data, period of use of the data, and/or re-distribution rights on the data, and the data set owner may respond with a modification of these terms. For example, the data set owner may initially specify that the data set must only be stored on the data marketplace platform and the prospective data set license buyer may ask to be able to copy the data set to their own local storage facility. The data set owner may accept this change in terms and/or may propose a higher price for the data set in response to the change in terms. In some examples, order module 112 may then receive, via the data marketplace platform, from the prospective data set license buyer, an acceptance of the counter-offer from the data set owner. In some examples, the negotiation process may continue for any number of offers and/or counter-offers.

In some embodiments, each counter-offer may be stored in the database as a child of the original negotiation entry. In one embodiment, the prospective buyer and/or data set owner may terminate the negotiation process at any time, which may cause the negotiation to be marked as closed in the database. If a counter-offer is accepted, an entry may be made in a database in the data market platform indicating that a license to the data set has been purchased with the amended terms.

In some embodiments, the order to license the data set from the data set owner may include an agreement about potential royalties owed to the data set owner on potential data sets derived from the data set. In some embodiments, the data marketplace platform may automatically manage royalty payments for data sets within the platform. For example, a buyer may purchase a license to use a data set with a 5% royalty on any licenses sold to derived data sets based on that data set. The data marketplace platform may record this transaction, and later, with the buyer sells a derived data set via the data marketplace platform, may transfer 5% of the sale price to the owner of the initial data set.

In one embodiment, order module 112 may receive, from the prospective data set license buyer via the data marketplace platform, a request to view a sample of the data set. In some examples, the systems described herein may then receive, via the data marketplace platform, authorization from the data set owner to grant access to the sample of the data set to the prospective data set license buyer and may grant, via the data marketplace platform, access to the sample of the data set to the prospective data set license buyer in response to receiving the authorization from the data set owner. In some embodiments, order module 112 may receive the request to view the sample before the order for the data set is created and/or at any point in the negotiation process. In some examples, the data set owner may create a custom data sample for each data sample request. In other examples, the data marketplace platform may store a sample of the data set to be sent to each prospective buyer who requests it.

In some embodiments, order module 112 may allow the prospective buyer to view the data sample by allowing the prospective buyer and/or an analyst contracted by the buyer to run a limited number of queries on the data set. Additionally or alternatively, order module 112 may randomly choose a sample of the data for the prospective buyer to view. In some embodiments, order module 112 may choose the sample in such a way as to ensure that only a certain percentage of the data set is exposed to a given prospective buyer or to all prospective buyers and/or to increase the percentage of the data set that is exposed to various prospective buyers to elicit a more robust rating of the data set.

In one embodiment, order module 112 may notify the data set owner of the order. For example, order module 112 may send a message on the data marketplace platform, display a graphic on the data marketplace platform, send an email message, send a text message, and/or send any other kind of message to the data set owner. In some embodiments, order module 112 may notify a data set owner and/or a prospective data set license buyer every time the other party makes a new counter-offer during a negotiation.

At step 312, one or more of the systems described herein may provide, via the data marketplace platform and in response to the order, access for the prospective data set license buyer to the data set. For example, providing module 114 may, as part of server 206 in FIG. 2, provide, via data marketplace platform 208 and in response to order 216, access for data set buyer 214 to data set 124.

Providing module 114 may provide access to the data set in a variety of ways. For example, providing module 114 may allow the data set license buyer to access the data set where it is currently stored on the data marketplace platform. In another example, providing module 114 may provide the buyer with credentials to access the data set at another location where the data set is stored. Additionally or alternatively, providing module 114 may create a copy of the data set for the buyer, either on the data marketplace platform or elsewhere. In some examples, providing module 114 may provide the buyer with information to access a copy of the data set sent out-of-band. For example, the data set owner may ship the data set to the buyer on a physical hard drive and providing module 114 may provide a tracking number for the shipped hard drive. In some examples, providing module 114 may provide the data set by providing access to the data set to an analyst contracted by the license buyer. In some embodiments, the license buyer may not have direct access to the data set.

In some examples, providing module 114 may automatically provide the data set in response to the order without action from the data set owner. In these examples, the data set owner may have created the sale listing with a non-negotiable price and non-negotiable terms and/or may have indicated that any prospective buyer who accepts the terms on the sale listing should be granted automatic access to the data set. In some embodiments, the systems described herein may notify the data set owner that an automatic transaction has taken place.

In one embodiment, order module 112 may receive the order to license the data set by receiving a bid to license the data set and providing module 114 may provide access to the data set is in response to the data set owner accepting the bid to license the data set. For example, the data set owner may list the data set without a defined price. In this example, the prospective buyer may make a bid on the data set and the data set owner may accept that bid. Providing module 114 may then provide access to the data set for the data set license buyer.

In some examples, providing module 114 may provide access for the prospective data set license buyer to the data set is in response to receiving confirmation, via the database market platform, that the prospective data set license buyer has paid the data set owner. In some embodiments, the payment transaction may take place on the data marketplace platform. In other embodiments, the data marketplace platform may utilize a third party payment service that may send a confirmation once the payment has cleared. In some examples, the payment may be monetary, such as by credit card. Additionally or alternately, the payment may include other assets. For example, a data set owner may trade access to one data set for access to another data set owned by the prospective data set license buyer in lieu of or in addition to money. In another example, an analyst may trade data set analysis services on one or more data sets for the right to create and license derivatives of a particular data set.

In some examples, a buyer may purchase a data set via the data marketplace platform rather than purchasing only a license for the data set. In these examples, the rights and/or access to the data set may be transferred entirely from the data set owner to the data set buyer via the data marketplace platform.

In some examples, systems described herein may receive, via the data marketplace platform, a request from a prospective data set license buyer for at least one data set analyst registered with the data marketplace platform to analyze a data set. In some examples, a data set owner may also request the services of a data set analyst. A request for analysis services may include information about the data set to be analyzed, a fee to be paid to the analyst, terms about the usage of the data set including storage, access, and/or rights to derivative works, requirements for the analyst (e.g., education, rating, experience etc.), and/or any other terms relating to analysis of the data set. An analyst may negotiate with a data set owner or buyer or may accept the terms initially offered.

In some examples, the systems described herein may make the data set available to the data set analyst via the data marketplace platform in response to the prospective data set license buyer and/or data set owner accepting the offer from the data set analyst. In some embodiments, an analyst may analyze a data set using their own tools and using access provided by the data marketplace platform. Additionally or alternatively, the data marketplace platform may provide tools for data set analysis. For example, the data marketplace platform may provide HADOOP as a tool to data set owners and/or analysts. If the data set is stored by the data marketplace platform, the data marketplace platform may record any actions the analyst takes such as using analytical tools on the data and/or creating copies of the data. In some examples, the recorded actions may later be audited by the party that contracted the analyst in order to ensure that the terms of the contract were met.

In some embodiments, the data marketplace platform may display the terms of the agreement with the data set owner to the analyst and/or may ask the analyst to verify that the analyst agrees to the terms before allowing the analyst access to the data set. If the analyst does not agree to the terms, the data marketplace platform may notify the data set owner that the analyst cannot complete the work as agreed.

In some embodiments, the data marketplace platform may provision a scratch space for the analyst to analyze the data set and/or store the results of the analysis. For example, the analyst may have created an EXCEL file, a visualization, a report, and/or other data products and may copy the files to the scratch space. In another example, the analyst may use HADOOP to run a map-reduce operation on the data set to produce a derived data set that will be stored in the scratch space. When the analysis has indicated that the analysis is complete, the data marketplace platform may freeze the scratch space to prevent further changes and/or may re-label the scratch space as a data set and/or data product. In some examples, the systems described herein may then give the data set owner that contracted the analyst access to the data set and/or data product. In some examples, the data marketplace platform may allow the analyst to list the data set and/or data product for sale in accordance with an agreement with the data set owner about the rights to derivative data sets.

In some examples, the analyst may analyze the data set in place. For example, the data set analyst may cleanse the data set. In some embodiments, any changes to a data set may be saved as snapshots of the data set. In these embodiments, the data marketplace platform may mark the snapshot that represents the completed work as a derived data set. The data marketplace platform may then give the data set owner access to the derived data set and/or notify the data set owner that the derived data set has been created.

In some examples, an analyst may analyze more than one data set in order to produce a new data set and/or data product. The analyst may acquire access to the data sets from the same data set owners, from different data set owners, and/or may already have access to one or more data sets. In some embodiments, the data marketplace platform may automatically manage licensing and/or royalties for derived data sets created from multiple data sets. For example, if a data analyst creates a derived data set based on three data sets owned by three separate data owners, the derived data set and/or data product may be subject to a combination of the licensing terms from all three original data sets and/or may transfer a percentage of the price of any sale to all three data set owners.

In some embodiments, once the analyst has finished their work, the systems described herein may revoke the analyst's access to the data set. The analyst and the data set owner may then be given the opportunity to produce ratings and/or reviews of one another, the data set that was analyzed, and/or the derived data set and/or data product that was created by the analyst.

In some examples, once the analyst has provided their service to the data set owner, the data set owner may pay the analyst via the data marketplace platform. In other examples, the analyst may be paid via the data marketplace platform before the work is done and/or on some other payment schedule. In some examples, the analyst may negotiate an agreement with the data set owner for royalties of any derivative data produced from any data set produced as a result of the analyst's work. In some embodiments, the data marketplace platform may automatically manage royalties in this situation. For example, the data set owner may list the data set created by the analyst for licensing on the data market platform and the data marketplace platform may transfer to the analyst 3% of any proceeds from the future licensing of the data set.

In some examples, a data set owner may search for a data set analyst to perform analysis on one or more data sets. For example, a data set owner may search for an analyst that has at least five years' experience, an analyst that specializes in demographic data, an analyst with an average rating of at least four stars, and/or an analyst that offers services below a certain cost. The data set owner may then make an offer for the analyst to analyze the data set, and the analyst may accept the offer, refuse the offer, or negotiate the terms of the offer.

In one embodiment, systems described herein may receive, via the data marketplace platform, a request for data from a prospective data set license buyer that describes a requested data set that the prospective data set license buyer does not own. In this embodiment, display module 110 may display the request for data on the data marketplace platform to a requested data set owner who owns the requested data set and stores the requested data set on the data marketplace platform and/or a data set analyst registered with the data marketplace platform who can analyze the requested data set. In some examples, a request for data may be or include a request for analysis. For example, a request for data may be a request to create a visualization of a data set owned by the prospective data set license buyer. Requests for data may include any or all of the information included in sale listings, such as an asking price for the requested data set, a preferred licensing agreement for the requested data set, tags of the requested data set, and so forth. Requests for data may also include additional information such as a deadline by which the requested data set must be completed (e.g., if the requested data set is a derivative of an existing data set and/or an analysis of a data set), an expiration date for the request for data, a description of any existing data sets from which the requested data set may be derived, and/or any restrictions on the data set and/or derivative work requested.

In some examples, systems described herein may receive, via the data marketplace platform, an offer from the requested data set owner to sell a license for the requested data set to the prospective data set license buyer, an offer to analyze the requested data set from the data set analyst, and/or, an offer to acquire a license to the requested data set from the data set analyst. Offers to license and/or analyze data sets may go through a similar negotiation process to that described above in connection with buying a data set. The buyer, seller, and/or analyst may negotiate on price, licensing terms, location of the data set, type and/or scope of analysis, rights for derivative data sets, and/or any other aspects of the potential data set licensing agreement.

In some examples, a data set analyst may offer to both acquire a license to and analyze a data set for a prospective buyer. For example, a prospective buyer may put out a request for data that described demographic data in a certain region. In this example, an analyst may offer to buy a license for a data set that includes modified census data and analyze the data set to produce the requested demographic data. In some examples, this data set may also be located on the data marketplace platform. In examples where the analyst is offering to acquire a license for the data set, the analyst may include the cost of the data set in the price of their offer to analyze the data set. In some examples, an analyst may also be a data set owner and may offer to both analyze and license a data set they own. If the analyst owns the data set already or acquired the license to the data set, the prospective buyer may only have access to the derivative data and/or data product created by the analyst, not the data set itself, unless agreed upon with the analyst. In some embodiments, an analyst may be able to include comments with their offer to analyze the data set, for example outlining their relevant skills, asking for clarification, and/or justifying their negotiating terms.

FIG. 4 is a flow diagram of an exemplary process for requesting a data set via the data marketplace platform. At step 402, a potential buyer may post a request for data on the data marketplace platform. The request may include the type of the requested data set, the size of the requested data set, the price of the requested data set, and/or any other characteristics. The request may also include a request for analysis on the requested data set. At step 404, a data set owner may respond to the request for data with an offer to license a data set owned by the data set owner. From there, the potential buyer may respond in several ways.

At step 406, the potential buyer may reject the offer from the data set owner. At step 408, the potential buyer may negotiate with the data set owner. The potential buyer may negotiate on licensing terms, price, or any other aspect of the agreement. If multiple data set owners have offered to license their data sets, the potential buyer may ask them to compete with each other's prices and/or licensing terms. Alternatively, at step 408, the potential buyer may simply accept the offer from the data set owner. If the potential buyer rejected the offer or the negotiation failed, at step 410 the potential buyer may not license the data set from the data set owner. If the potential buyer accepted the offer or the negotiation succeeded, at step 414 the potential buyer and the data set owner may come to an agreement to license the data set to the potential buyer.

The potential buyer may also receive offers from one or more data set analysts. At step 416, a data set analyst may respond to the request for data with an offer to analyze the data set once it is acquired and/or to acquire access to the data set. Similarly to the above, the potential buyer may accept the offer at step 418, negotiate at step 420, and/or reject the offer at step 422. If the offer was rejected or the negotiation failed, at step 426 the potential buyer may not contract the services of the data set analyst. If the offer was accepted or the negotiation succeeded, at step 424 the potential buyer and the data set analyst may come to an agreement for the analyst to analyze the data set. A potential buyer may contract the services of more than one analyst to analyze a given data set. Whether the buyer accepted an offer to buy a license for a data set from a data set owner or accepted the services of an analyst, at step 428 the potential buyer may receive access to the data set and/or an analysis of the data set.

In some embodiments, a data set analyst and/or a data set owner may be able to browse requests for data in a similar manner to how a prospective buyer may be able to browse existing data sets as detailed above. For example, a data set analyst and/or owner may be able to browse requests for data by category, tag, requesting entity, date added, price range, and so forth. In some embodiments, a data set analyst and/or data set owner may be able to set alerts to be triggered when relevant requests for data are added to the data marketplace platform. For example, a data set analyst who specializes in financial data for technology corporations might set an alert to be notified by the data marketplace platform when a request for data with the tags "financial data" and "technology" is added to the data marketplace platform. The data marketplace platform may then notify the data set analyst when any request for data that fits those criteria is created.

In some embodiments, the data marketplace platform may allow data set owners, prospective data set license buyers, and/or data analysts to send messages to one another. For example, a data analyst may ask questions about a request for data without creating an offer to fulfill the request for data.

As described above, the data marketplace platform may allow data set owners, buyers, and/or analysts to all interact with each other in a variety of ways. FIG. 5 is a block diagram of an exemplary data marketplace platform 502. As illustrated in FIG. 5, data marketplace platform 502 may allow a data set owner 504, a data set license buyer 524, and/or a data set analyst 534 to interact with each other. Data set owner 504 may have a rating 506. The rating may be an individual rating from a previous buyer and/or analyst that has interacted with data set owner 504, a list of individual ratings, and/or an average of multiple ratings. In some examples, data set owner 504 may own data set 508 and/or data set 518. Data set 508 may have a rating 510 that may also be an individual and/or average rating as well as a sale listing 512. Data set 518 may also have a rating 520 and a sale listing 522.

Data set license buyer 524 may have a rating 526. Rating 526 may be an individual rating from a data set owner who has sold a license to data set license buyer 524 and/or an analyst who has analyzed a data set for data set license buyer 524 and/or rating 526 may be an average of multiple ratings. In cases where data set license buyer 524 is also a data set owner, rating 526 may include ratings from data set license buyers that have licensed data sets from data set license buyer 524. In some examples, data set license buyer 524 may have separate average rating scores from analysts, other data set license buyers, and/or data set owners. In some examples, data set license buyer 524 may make an offer 528 to buy a license for data set 518 after viewing sale listing 522. Data set owner 504 may then negotiate with data set license buyer 524 about the precise terms of licensing data set 518. Data set license buyer 524 may also create a request for data 530.

Data set analyst 534 may have a rating 536. Rating 536 may be an individual rating from another data set analyst, a data set buyer, and/or a data set owner that data set analyst 534 has worked with in the past and/or may be an average of multiple ratings. In some embodiments, rating 536 may also include reviews of data set analyst 534's work. Data set analyst may make an offer 538 to acquire a license for and/or analyze the data requested in request for data 530. Data set license buyer 524 may then negotiate with data set analyst 534 about the precise terms of the agreement. Data set analyst 534 may also create a data product 540 based on data set 508 according to an agreement with data set owner 504. In some embodiments, data product 540 may be stored on data marketplace platform 502, may be listed for sale on data marketplace platform 502, and/or may be accessible via data marketplace platform 502.

In some embodiments, the data marketplace platform may track a transition from the delivery phase to the fulfillment phase. For example, after a data set owner and/or analyst has come to an agreement with a prospective buyer, the data marketplace platform may expect the buyer to indicate that the data set was made accessible or that the data service was performed. The data marketplace platform may consider the transaction to be "waiting for fulfillment" until the buyer indicates to the data marketplace platform (e.g., by submitting an electronic form) that the data set owner has fulfilled on their part of the negotiated terms. In some examples, the data set owner may be waiting for an analyst to complete their data service and/or the prospective buyer may be doing some analysis of their own to make sure the data set meets their needs.

In some examples, the data marketplace platform may follow up based on periods of time for check-ins on the prospective buyer's progress in deciding on fulfillment that may be included in the negotiated terms. When one of these check-in points occurs, the data marketplace platform may notify the prospective buyer and/or the data set owner. The negotiated terms may also indicate penalties if the fulfillment is not approved in time. For example, if there is a monetary penalty, then the data marketplace platform may even transfer funds from the prospective buyer to the data set owner automatically if such an action has been agreed upon in the negotiated terms.

In the case of the analyst, once the analyst has indicated that a derived data set, data product, and/or other analysis work is completed, the data marketplace platform may ask the analyst if they would like to request approval on fulfillment. If so, the transaction record that is associated with the analyst, the buyer or data set owner that contracted the analyst's services, the data set, and/or the request for data and negotiated terms is marked as "waiting for fulfillment" and/or the buyer or data set owner is notified. The buyer and/or data set owner may then review the derived data set and/or data product to see if it meets their needs as defined in the negotiated terms. The buyer and/or data set owner and the analyst may have similar terms as described above with the data set owner to ensure the fulfillment is approved in a timely fashion. In some embodiments, if the analyst does not request fulfillment when prompted by the data marketplace platform, they may do so at any later time. For example, the analyst may be able to return to the data marketplace platform and submitting a form associated with the request for data and/or the data set indicating that the analyst is requesting approval.

When the buyer receives notification that the data set is accessible to the buyer from a data set owner or the analyst has fulfilled the data service, then the buyer may review the data set and/or analysis work. In some embodiments, the data marketplace platform may provision the data set and/or analysis work for the prospective buyer. When the buyer has reviewed the data set and/or analysis work, the data marketplace platform may prompt them to indicate whether to approve the fulfillment, not approve at this time, or reject the fulfillment. In some embodiments, if the buyer rejects fulfillment then the data marketplace platform may indicate that the buyer must provide a reason why and suggest what must be done in order to move the transaction to fulfillment. The buyer may also lose access to the derived data at this point depending on the negotiated terms. If the buyer simply does not approve at this time, then the buyer may later approve the request for fulfillment. In some examples, the data marketplace platform may periodically notify and/or penalize the buyer for not approving or rejecting the fulfillment in a timely fashion as agreed upon in the negotiated terms.

If the buyer approves, then the data marketplace platform may mark the transaction as "completed and approved." In some embodiments, the data marketplace platform may also prompt the buyer to provide a rating for the data set owner, analyst, and/or data set involved. If there is a payment to be made at this time then the data marketplace platform may facilitate the transfer of funds. When remuneration has completed, the data marketplace platform may mark the transaction as "completed."

In some embodiments, the data marketplace platform may include a private instance of the data marketplace platform that is accessible to only one organization and is privately hosted by that organization. In some examples, the systems described herein may link the private instance of the data marketplace platform with a public instance of the data marketplace platform that is accessible to multiple organizations and/or transfer at least one licensed data set between the private instance of the data marketplace platform and the public instance of the data marketplace platform in response to the prospective data set license buyer purchasing a license to the licensed data set.

For example, an organization such as SYMANTEC may have a private instance of a data marketplace platform that hosts and/or lists only data sets owned by SYMANTEC and analysts employed by SYMANTEC. SYMANTEC may use this private data marketplace platform to organize data sets and/or to exchange data sets between departments and/or divisions. When a representative of SYMANTEC purchases a data set from another organization on a public data marketplace platform, the systems described herein may transfer that data set to SYMANTEC's private instance of the data marketplace platform. In another example, a representative of SYMANTEC may see a request for data on the public data marketplace platform and may offer to license a data set that is stored on the private instance of the data marketplace platform. If the offer is accepted, the systems described herein may transfer the data set from SYMANTEC's private data marketplace platform to the public data marketplace platform so that the data set buyer can access the data set.

In some examples, two or more parties may each have a private instance of a data marketplace platform and may conduct transactions directly between the private instances of the data marketplace platform. For example, two parties may each have a private instance of a data marketplace platform and may transfer data sets between them according to one or more of the licensing and/or data sharing arrangements discussed herein. In one example, an analyst may have their own private instance of a data marketplace platform. For example, SYMANTEC may hire the analyst to perform analysis of a data set and the systems described herein may then transfer the data set from SYMANTEC's private data marketplace platform to the analyst's private data marketplace platform.

In some embodiments, a data marketplace platform may be owned and/or hosted by a platform proprietor. The platform proprietor may charge a variety of fees to other parties. For example, the platform proprietor may charge membership fees at various levels to data set owners, data set license buyers, and/or data set analysts. In another example, the platform proprietor may charge for the use of analytical tools provided by the data marketplace platform. Additionally or alternatively, the platform proprietor may charge transaction fees. For example, the platform proprietor may charge a 1% fee on all monetary transactions that take place on the data marketplace platform.

As explained above, in some examples a data analyst may produce a data product based on an analysis of one or more data sets licensed and/or accessed through the data marketplace platform. In some examples, the systems described herein may host and/or provide access to the data product (e.g., for the buyer) via the data marketplace platform. Additionally, in some examples, the systems described herein may create a listing for the data report for licensing to one or more additional parties. For example, the buyer of the license to one or more data sets and the analyst who produces a data product derived from the data sets for the buyer may arrange to make the data product available for license to other prospective buyers via the data marketplace platform. In some examples, the data marketplace platform may determine that the buyer and the analyst are entitled to list the data product for licensing via the data marketplace platform based on the data sets underlying the data product having been provided by the buyer and the data product having been produced by the analyst. In some examples, the data marketplace platform may determine whether the buyer and/or the analyst are entitled to list the data product for licensing (and, in some examples, under what conditions the data product may be licensed) based on an agreement under which the analyst produced the data product for the buyer.

As described in connection with method 300 above, the data marketplace platform may revolve around four roles and/or a marketplace lifecycle. The roles may include data set license buyer, data set owner, data set analyst, and/or platform proprietor. A buyer may use the data marketplace platform to search for and identify data sets that are useful for their analysis purposes. The platform may support the buyer issuing requests for data sets as well as requests for data services that are provided by data set analysts. The platform may also provide a mechanism to allow for negotiating the terms of use for data sets and/or data services. The platform may then allow that usage to occur once the various parties have agreed on terms.

The data set owner may own the rights to some data sets. The data set owner may use the platform to place their chosen data sets into a listing that is visible to buyers who have access to that listing. The data set owner may place enough information in the listing so that an educated buyer has some assistance from this information in deciding whether the data set is useful to them or not. If a buyer decides to pursue use of a data set, the platform may provide the negotiation capabilities that allow the data set owner and buyer to agree to terms. The platform may also provide capabilities that allow the data set owner to view which buyers have obtained rights to what data sets and the details of those rights.

The analyst may use the data sets stored in the platform in order to provide data services. In some examples, the analyst may use the platform to help locate buyers and/or data set owners that are requesting data services. The analyst then may then use the platform to negotiate the terms of the data service with the buyer and/or data set owner. The platform may then provide access to the data set the analyst is working on so that the analyst's tools can access that data set. When the data service is complete the analyst may use the platform to deliver the results to the buyer and/or data set owner.

The proprietor of a platform may provide access to their data marketplace platform as a service to buyers, data set owners, and analysts as a means to help list and find data, as a place to gain access to data for analysis toolsets (that may also be provided by the platform), and/or as a way to do negotiations, perform data transfers, and/or allow for payment. The proprietor may ask to be compensated for any or all of these services. In addition, the proprietor may connect various instances of the platform together and/or manage users of the system.

The data marketplace platform may solve at least two key problems in data acquisition and management. Firstly, the platform may connect the various parties involved in acquiring and analyzing data and/or may provide technology to improve the efficiency of the negotiation process where the parties agree on terms of use for data sets and/or data services. Secondly, the platform may also monitor the negotiated terms for compliance, provide support for using and transferring the data, and/or provide for enforcement and/or fulfillment of the terms. The platform may allow data set owners to more easily monetize their data sets, data set analysts to more easily offer their skills, and data set license buyers to more easily find, evaluate, and purchase licenses for data sets that they may use to add value to their business.

Figure 6:
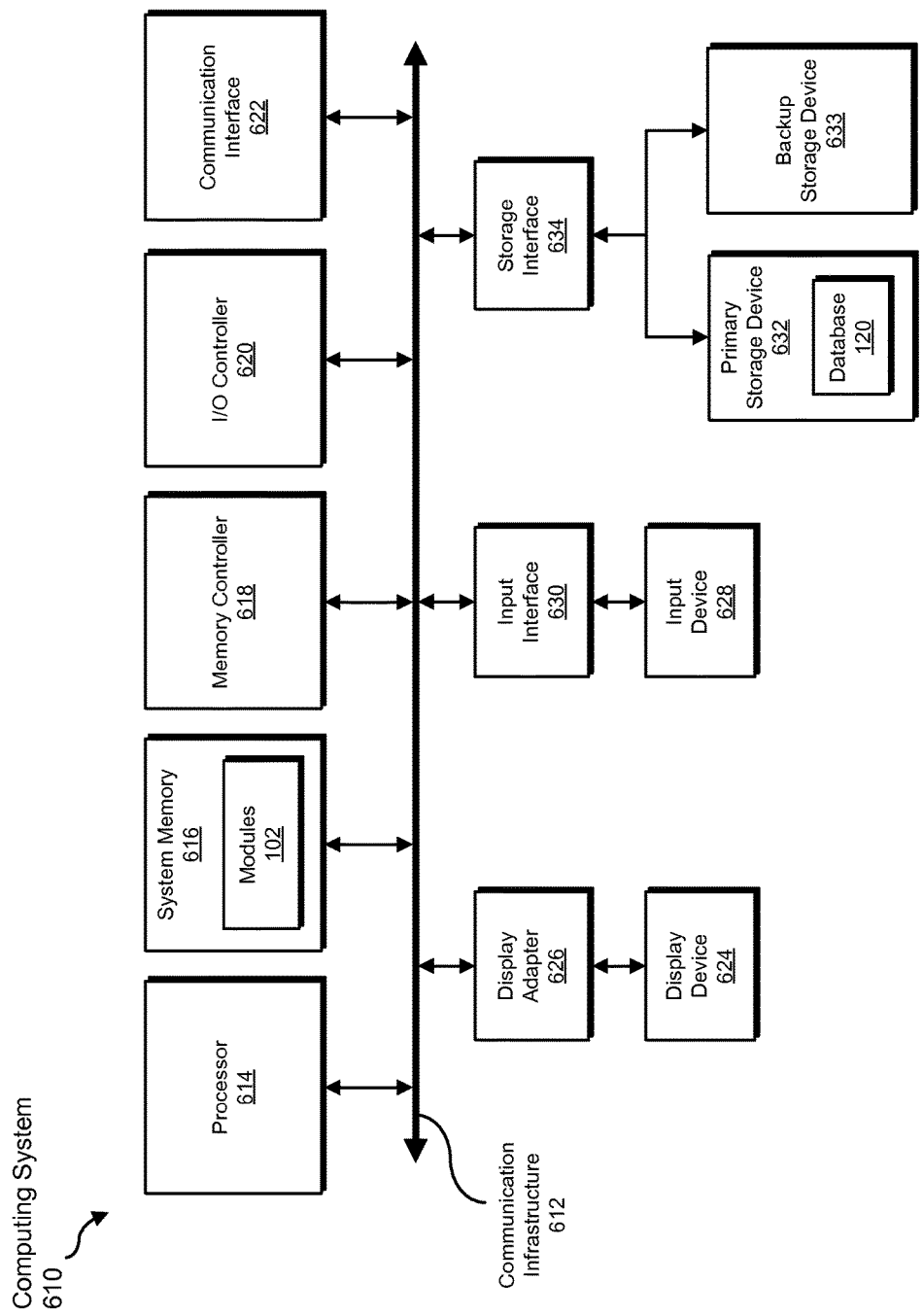
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
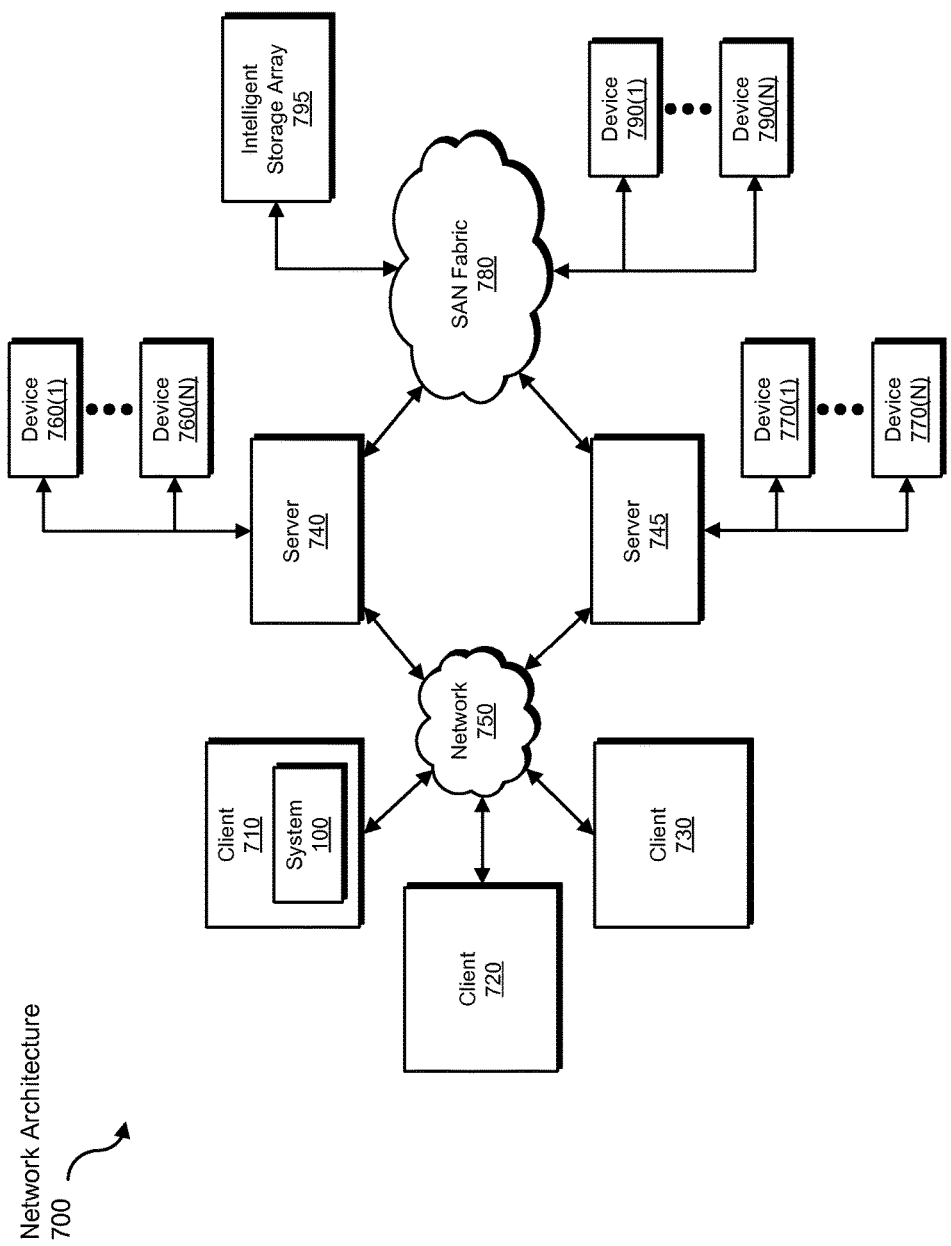
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for providing access to data sets owned by different entities.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data sets to be transformed, transform the data sets into sale listings, output a result of the transformation to a data marketplace platform, use the result of the transformation to list the data sets for licensing, and store the result of the transformation to a data marketplace platform. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing access to data sets owned by different entities, at least a portion of the method being performed by a server computing device comprising at least one processor, the method comprising:
    providing, by the server computing device, a data marketplace platform on the server computing device that allows a plurality of data set owners to each list their own data sets for licensing to any of a plurality of prospective data set license buyers, wherein each data set comprises a plurality of samples from a statistical population and at least one variable describing each sample, wherein at least one of the plurality of samples comprises data from a portion of a timespan covered by the data set;
    receiving, by the server computing device, at the data marketplace platform, a data set owned by a data set owner, wherein receiving the data set comprises storing information about a location of the data set or information for accessing the data set, wherein the data set is not on the data marketplace platform, wherein the information about a location of the data set or information for accessing the data set is stored by:
        provisioning, by the server computing device, a scratch space to store results of a user analysis of the data set;
        storing, by the server computer device, a derivation of the data set in the scratch space, wherein the derivation of the data set is created in response to a map-reduce operation received on the data set; and
        relabeling, by the server computer device, the scratch space as the data set;
    creating, by the server computing device, a sale listing for the data set that comprises information about the data set and information about the data set owner;
    displaying, by the server computing device, on the data marketplace platform, the sale listing for the data set to at least one prospective data set license buyer who does not own the data set;
    receiving, by the server computing device, from the prospective data set license buyer, an order to license the data set from the data set owner; and
    providing, by the server computing device, via the data marketplace platform and in response to the order, access for the prospective data set license buyer to the data set.

2. The computer-implemented method of claim 1 wherein:
    receiving the order to license the data set comprises receiving a bid to license the data set;
    providing access to the data set is in response to the data set owner accepting the bid to license the data set.

3. The computer-implemented method of claim 1, further comprising:

receiving, via the data marketplace platform, from the data set owner, a counter-offer in response to receiving the order from the prospective data set license buyer;

receiving, via the data marketplace platform, from the prospective data set license buyer, an acceptance of the counter-offer from the data set owner.

4. The computer-implemented method of claim 1, wherein receiving, at the data marketplace platform, the data set comprises analyzing the data set at the data marketplace platform to gather metadata about the data set.

5. The computer-implemented method of claim 1, wherein the information about the data set comprises at least one of:
   a rating of the quality of the data set provided by at least one previous data set license buyer with previous access to the data set via the data marketplace platform;
   a rating of the quality of the data set provided by at least one data set analyst registered with the data marketplace platform with previous access to the data set via the data marketplace platform;
   a sample of data from the data set.

6. The computer-implemented method of claim 1, wherein providing access for the prospective data set license buyer to the data set is in response to receiving confirmation, via the database market platform, that the prospective data set license buyer has paid the data set owner.

7. The computer-implemented method of claim 1, wherein the order to license the data set from the data set owner comprises an agreement about potential royalties owed to the data set owner on potential data sets derived from the data set.

8. The computer-implemented method of claim 1, further comprising:
   receiving, via the data marketplace platform, a request for data from the prospective data set license buyer that describes a requested data set that the prospective data set license buyer does not own;
   displaying the request for data on the data marketplace platform to at least one of:
   a requested data set owner who owns the requested data set and stores the requested data set on the data marketplace platform;
   a data set analyst registered with the data marketplace platform who can analyze the requested data set.

9. The computer-implemented method of claim 8, further comprising at least one of:
   receiving, via the data marketplace platform, an offer from the requested data set owner to sell a license for the requested data set to the prospective data set license buyer;
   receiving, via the data marketplace platform, an offer to analyze the requested data set from the data set analyst;
   receiving, via the data marketplace platform, an offer to acquire a license to the requested data set from the data set analyst.

10. The computer-implemented method of claim 1, further comprising:
    receiving, via the data marketplace platform, a request from the prospective data set license buyer for at least one data set analyst registered with the data marketplace platform to analyze the data set;
    receiving, via the data marketplace platform, an offer from the data set analyst to analyze the data set for the prospective data set license buyer using access potentially provided to the data set by the data marketplace platform.

11. The computer-implemented method of claim 10, further comprising making the data set available to the data set analyst via the data marketplace platform in response to the prospective data set license buyer accepting the offer from the data set analyst.

12. The computer-implemented method of claim 11, further comprising making an analysis of the data set available to the prospective data set license buyer via the data marketplace platform in response to the data set analyst indicating that the analysis is complete.

13. The computer-implemented method of claim 1, further comprising:
    receiving, via the data marketplace platform, a search query from the prospective data set license buyer that includes at least one characteristic defining a type of data set that the prospective data set license buyer is interested in;
    displaying, to the prospective data set license buyer, on the data marketplace platform, a list of available data sets for licensing that are stored on the data marketplace platform and satisfy the characteristic.

14. The computer-implemented method of claim 1, further comprising:
    receiving, via the data marketplace platform, a search query from the prospective data set license buyer that includes at least one characteristic defining a type of data set analyst that the prospective data set license buyer is interested in;
    displaying, to the prospective data set license buyer, on the data marketplace platform, a list of available data set analysts registered with the data marketplace platform that satisfy the characteristic.

15. The computer-implemented method of claim 1:
    wherein the data marketplace platform comprises a private instance of the data marketplace platform that is accessible to only one organization and is privately hosted by that organization;
    further comprising linking the private instance of the data marketplace platform with a public instance of the data marketplace platform that is accessible to multiple organizations;
    further comprising transferring at least one licensed data set between the private instance of the data marketplace platform and the public instance of the data marketplace platform in response to the prospective data set license buyer purchasing a license to the licensed data set.

16. The computer-implemented method of claim 1:
    wherein the data marketplace platform comprises a private instance of the data marketplace platform that is accessible to only one organization and is privately hosted by that organization;
    further comprising an additional private instance of the data marketplace platform that is accessible to only one additional organization and is privately hosted by that additional organization;
    further comprising linking the private instance of the data marketplace platform with the additional private instance of the data marketplace platform;
    further comprising transferring at least one licensed data set between the private instance of the data marketplace platform and the additional private instance of the data marketplace platform in response to the prospective data set license buyer purchasing a license to the licensed data set.

17. The computer-implemented method of claim 1, further comprising:

receiving, from the prospective data set license buyer via the data marketplace platform, a request to view a sample of the data set;

receiving, via the data marketplace platform, authorization from the data set owner to grant access to the sample of the data set to the prospective data set license buyer;

granting, via the data marketplace platform, access to the sample of the data set to the prospective data set license buyer in response to receiving the authorization from the data set owner.

18. The method of claim 1, further comprising offering an option to store the data set on the data marketplace platform or to store the information about the location of the data set or the information for accessing the data set.

19. A system for providing access to data sets owned by different entities, the system comprising:

a platform module, stored in memory, that provides, by a server computing device, a data marketplace platform on a server computing device that allows a plurality of data set owners to each list their own data sets for licensing to any of a plurality of prospective data set license buyers, wherein each data set by a plurality of samples from a statistical population and at least one variable describing each sample, wherein at least one of the plurality of samples comprises data from a portion of a timespan covered by the data set;

a receiving module, stored in memory, that receives, by the server computing device, at the data marketplace platform, a data set owned by a data set owner, wherein the data set is received by storing information about a location of the data set or information for accessing the data set, wherein the data set is not stored on the data marketplace platform, wherein the information about a location of the data set or information for accessing the data set is stored by:

provisioning, by the server computing device, a scratch space to store results of a user analysis of the data set;

storing, by the server computer device, a derivation of the data set in the scratch space, wherein the derivation of the data set is created in response to a map-reduce operation received on the data set; and relabeling, by the server computer device, the scratch space as the data set;

a creation module, stored in memory, that creates, by the server computing device, a sale listing for the data set that by comprises information about the data set and information about the data set owner;

a display module, stored in memory, that displays, by the server computing device, on the data marketplace platform, the sale listing for the data set to at least one prospective data set license buyer who does not own the data set;

an order module, stored in memory, that receives, by the server computing device, from the prospective data set license buyer, an order to license the data set from the data set owner;

a providing module, stored in memory, that provides, by the server computing device, via the data marketplace platform and in response to the order, access for the prospective data set license buyer to the data set;

at least one physical processor configured to execute the platform module, the receiving module, the creation module, the display module, the order module, and the providing module.

20. A non-transitory computer-readable medium comprising one or more computer-readable instructions that, when executed by at least one processor of a server computing device, cause the server computing device to:

provide a data marketplace platform on the server computing device that allows a plurality of data set owners to each list their own data sets for licensing to any of a plurality of prospective data set license buyers, wherein each data set comprises a plurality of samples from a statistical population and at least one variable describing each sample, wherein at least one of the plurality of samples comprises data from a portion of a timespan covered by the data set;

receive, by the server computing device, at the data marketplace platform, a data set owned by a data set owner, wherein the data set is received by storing information about a location of the data set or information for accessing the data set, wherein the data set is not stored on the data marketplace platform, wherein the information about a location of the data set or information for accessing the data set is stored by:

provisioning, by the server computing device, a scratch space to store results of a user analysis of the data set;

storing, by the server computer device, a derivation of the data set in the scratch space, wherein the derivation of the data set is created in response to a map-reduce operation received on the data set; and relabeling, by the server computer device, the scratch space as the data set;

create, by the server computing device, a sale listing for the data set that comprises information about the data set and information about the data set owner;

display, by the server computing device, on the data marketplace platform, the sale listing for the data set to at least one prospective data set license buyer who does not own the data set;

receive, by the server computing device, from the prospective data set license buyer, an order to license the data set from the data set owner;

provide, by the server computing device, via the data marketplace platform and in response to the order, access for the prospective data set license buyer to the data set.

* * * * *

UNITED STATES PATENT AND TRADEMARK OFFICE
CERTIFICATE OF CORRECTION

PATENT NO. : 10,192,250 B1
APPLICATION NO. : 14/664300
DATED : January 29, 2019
INVENTOR(S) : Aaron Christensen et al.

It is certified that error appears in the above-identified patent and that said Letters Patent is hereby corrected as shown below:

In the Claims

In Column 31, Line 12, Claim 18, after "The" insert -- computer-implemented --.

In Column 31, Line 50 (Approx.), Claim 19, after "that" delete "by".

Signed and Sealed this
Ninth Day of April, 2019

Andrei Iancu
*Director of the United States Patent and Trademark Office*